US005364670A

United States Patent [19]

Satoji et al.

[11] Patent Number: 5,364,670

[45] Date of Patent: Nov. 15, 1994

[54] STRIPPING FINGERS FOR COPYING MACHINE

[75] Inventors: Fuminori Satoji, Yokkaichi; Shoichi Hashimoto, Kuwana; Kuniaki Asai, Tondabayashi; Tadayasu Kobayashi, Tsukuba, all of Japan

[73] Assignees: NTN Corporation; Sumitomo Chemical Co., Ltd., both of Osaka, Japan

[21] Appl. No.: 889,699

[22] Filed: May 29, 1992

[30] Foreign Application Priority Data

May 31, 1991 [JP] Japan .................................. 3-129679
Apr. 24, 1992 [JP] Japan .................................. 4-106781

[51] Int. Cl.[5] ....................... C09K 19/00; B32B 23/02; B32B 27/00

[52] U.S. Cl. ........................................ 428/1; 428/194; 428/421; 428/422

[58] Field of Search ................... 428/422, 194, 421, 1; 423/279; 252/299.01; 528/180

[56] References Cited

U.S. PATENT DOCUMENTS 4,861,515 8/1989 Minamisawa et al. ......... 252/299.01
4,888,127 12/1989 Wada et al. .................... 252/299.01
4,925,641 5/1990 Kitamura et al. ................... 423/279
5,158,701 10/1992 Asai et al. ........................ 528/180 X

FOREIGN PATENT DOCUMENTS 62-245274 10/1987 Japan .
63-74084 4/1988 Japan .
64-70780 3/1989 Japan .
64-81980 3/1989 Japan .
2-247676 10/1990 Japan .

*Primary Examiner*—Paul J. Thibodeau
*Assistant Examiner*—Leszek Kiliman
*Attorney, Agent, or Firm*—Nikaido, Marmelstein, Murray & Oram

[57] ABSTRACT

Stripping fingers for use in a copying machine, molded of a liquid crystal polyester resin composition containing a liquid crystal polyester having a flow temperature of 340° C. or higher and aluminum borate whiskers. The stripping fingers have excellent heat deflection resistance, heat aging resistance, thermal shock resistance, heat load resistance, low attack on the counter roller, good shape retainability of the finger edges, and good non-stick property against toner. Coating with PFA at 330° C. or higher on the stripping finger increases non-tackiness.

3 Claims, 1 Drawing Sheet

STRIPPING FINGERS FOR COPYING MACHINE

This invention relates to stripping fingers for use in a copying machine.

In conventional dry-type copiers, a statically charged latent image formed on a sensitizing drum to represent letters or figures is converted into a toner image, which is then transferred onto a sheet of paper being supplied from a paper feeding cassette, and the toner image transferred onto the paper surface is pressed and heated with a hot fixing roller to fix the image to the paper, thus unseparably fusing the toner image and the paper fibers together. In order to discharge the paper sheet now carrying the image without getting caught by the fixing roller, the end of paper is scooped up with stripping fingers having their tips pressed tightly against the fixing roller. Such stripping fingers are required to have a small frictional resistance so that they will not damage the outer surface of the roller, and have a sufficient mechanical strength and high-temperature rigidity. Also their edges, especially their edge tips have to be shaped with high accuracy. Further, it is required that toner will not stick to them.

Many of the recent copiers are actually not simple copiers but what is called intelligent copiers having high-resolution image processing and editing functions and facsimile function and equipped with input/output devices for other office automation machines. Such multi-functioned, complex, systematized copiers are required to operate at higher speed and have a higher reliability and longer life than ordinary copiers.

Thus, high processing speed is an essential requirement for the recent copiers. The higher the processing speed, the higher the heating temperature with the fixing roller is usually set. Thus, the stripping fingers have to have a still higher heat resistance. Further, such fingers will be exposed to high temperature for an extremely long time in order to keep the copier turned on so that it can be used any time. Thus, the stripping fingers are required to have good heat fatigue resistance. Further, the stripping fingers are required to be able to follow various operating conditions in multifunctional copiers. Systematized copiers may be connected with those devices which are used in a life-or-death situation. High stripping reliability is required for the stripping fingers used in such copiers. Namely, the tips of such fingers have to have a high heat load resistance sufficient to ensure proper functioning even in an accident such as paper clogging. Also, their tips have to be shaped so that reliable separation is assured even if they are used continuously for a long time.

Conventional stripping fingers are made of polyimide, polyamideimide, polyphenylenesulfide, polyetherketone, polyethersulfone or polyetherimide. Of these materials, resin moldings made of polyethersulfone or polyetherimide having ordinary heat resistance have a glass transition point of about 220° C. and are amorphous. Since they soften at a temperature higher than the glass transition point, their heat resistance is too low to attain the heat resistance required for the stripping fingers used in high-speed copiers (250° C. or more).

Some resins such as polyethersulfone and polyetherimide have a glass transition temperature of 250° C. or more. But their lubricity and wear resistance are not good. This may lead to increased torque at the roller driving unit or poor separation. Even if a fluororesin coating is provided, the frictional surface with the roller will wear with long use, so that friction will occur between the substrates of the stripping fingers and the roller. Thus, poor lubricity and wear resistance of the substrates lead to shorter life and lower reliability.

Molded articles made of such resins as polyphenylenesulfide and polyetherketone have glass transition points of less than 250° C. But since they are crystalline resins, they can be reinforced by adding heat-resistant fibers such as glass fiber, potasium titanate fiber, carbon fiber or these fibers plus inorganic powdery fillers such as mica and talc, so that their heat resistance can be increased remarkably. But these materials have a problem in that the counter roller can be damaged and a reliability problem in that if the reinforcing materials are not filled at the edges or tips of the stripping fingers, their resistance to heat deflection deteriorates markedly.

Of the polyimide resins, a thermosetting polyimide resin, which can form a three-dimensional network, is brittle and thus requires reinforcement with filling materials as with the above-mentioned polyphenylenesulfide resin. Stripping fingers molded of polyamideimide resin have a heat resistance of 250° C. or more even if reinforcing materials are not used. But it has a problem that the heat resistance deteriorates if it absorbs water or moisture. If it absorbs a relatively large amount of water, the heat resistance will deteriorate markedly. More specifically, if the molded article is heated at a rapid rate when absorbing water, the water content in the molded article turns into high-pressure steam. It is well-known that if this happens in a molded article larger than a certain size, e.g. a sheet 127 mm long, 12.7 mm wide and 3.2 mm thick, the thickness increases more than 25 microns and the lowest temperature at which the surface swelling or foaming happens (what is called the thermal shock temperature) deteriorates markedly. The heat resistance of an article having a heat resistance of about 280° C. in an absolute dry condition will reduce to about 210° C. if it absorbs a large amount of water.

There are known polyimide resins called thermoplastic polyimides having a very great molecular weight such as polyimide made by Du PONT and known as Kapton, Vespel (Registered Trademarks). Although these resins have a high heat resistance, they are not practical because these resins cannot be made by melt molding such as injection molding.

Other potential candidates are aromatic polyesters, particularly liquid crystal polyesters which are melt moldable and show anisotropy at molten state (e.g. ones disclosed in Japanese Patent Publication 47-47870). This resin shows an orientation peculiar to liquid crystals, which shows self-reinforcement itself. Thus, its own heat deflection resistance is high. This serves to improve the heat deflection resistance with smaller amounts of reinforcing materials such as inorganic heat-resistant fibrous fillers or powdery fillers. Further since this material can be reinforced using fibers which are less likely to damage the counter material though their reinforcing effect is low compared with potassium titanate whiskers, attack on the counter material is less severe and brittleness due to oxygen crosslinking, which happens with polyphenylenesulfide resin, scarcely occurs, and heat aging resistance is also good.

Further, there will be no deterioration in the thermal shock temperature due to water absorption, which happens with polyamideimide resin moldings. Thus, those materials disclosed in Japanese Unexamined Patent Publications 62-245274 and 63-74084 have been used heretofore as materials for the stripping fingers. But they are not satisfactory in terms of reliability and longevity.

The surface temperature of the fixing roller in a copier is 150° C. or higher in general and most typically in the range of 170° C.–250° C. Thus, if the finger tips are subjected to an unordinarily large load due to paper clogging or the like, they may creep under high-temperature load. Further, since the self-reinforcement is provided by the liquid crystals, which are rather large units, if they are subjected to stress repeatedly at high temperature, these units tend to collapse, causing a sharp deterioration in the physical properties such as flexural modulus. In other words, the heat fatigue resistance is poor.

One reinforcing material which can improve the high-temperature rigidity, heat fatigue resistance and heat load resistance and which is less likely to damage the counter roller material is potassium titanate. But its reinforcing effect and the degree of improvements are small. More importantly, a composition of the liquid crystal polyester and potassium titanate whiskers is partially gelatinized when molded into stripping fingers by melting. This may lead to the formation of "blisters" on the surfaces of the fingers. If such blisters are present on the contact surface with the roller, it would become impossible to strip paper sheets from the roller. Further, the degree of self-reinforcement of the liquid crystal polyester due to its peculiar orientation varies widely. If it is small, the heat distortion temperature will be too low to be accepatable as stripping fingers. Further, if stripping fingers are molded of a liquid crystal polymer, the radius of curvature at their tips tends to be too small compared with those molded of a polyamideimide resin. Some of them even have less than 10-micron sharp edges. Even if a stripping finger with a favorable radius of curvature at its edge (10–50 microns) is obtained by molding, its edge may be too sharp due to scratches formed on the mold by fillers or the like. Such a finger may suffer heat deflection as a result of reduced high-temperature rigidity. As a result, paper stripping may become difficult or the roller outer surface may be damaged.

On the other hand, numerous proposals have been made to improve the non-stick property of the stripping fingers with respect to toner. For example, it was proposed to form on a stripping finger a coating of fluororesin or fluorinated polyether polymer or to incorporate a non-stick property modifier such as a fluororesin in the material. One conventional method which aims specifically to improve the non-stick property with respect to toner is to heat tetrafluoroethylene-perfluoroalkylvinylether copolymer (hereinafter abbreviated to PFA) above its melting point to fuse it to the stripping fingers. Since this technique does not use a binder resin (such as epoxy resin, polyimide resin or polyamideimide resin), which is used ordinarily in other techniques, the surface of the coating material solely consists of PFA resin. Thus, its non-stick property is excellent. But in order to firmly bond the PFA film to the stripping fingers so that the PFA can exhibits its inherent excellent non-stick property, it has to be heated to 330° C. or more. Very few resins can withstand such high temperatures. Even a stripping finger made of a liquid crystal polyester may deflect, shrink or develop blisters on the surface during the heat melting step.

As described above, there has been no stripping finger which has an excellent heat deflection resistance, heat aging resistance, thermal shock resistance, heat fatigue resistance and heat load resistance, which attacks the counter roller less severely, and which has an excellent non-stick property with respect to toner. It has been desired to provide stripping fingers which solve the abovesaid problems and meet the market requirements such as higher quality, higher reliability and longer life.

As a result of vigorous efforts to solve these problems, the present inventors have found that stripping fingers molded of a composition comprising a specific liquid crystal polyester and aluminum borate whiskers and having their tips only or their entire surfaces coated with a tetrafluoroethylene-perfluoroalkylvinylether copolymer meet the above requirements.

The liquid crystal polyester used in this invention has a flow temperature of 340° C. or higher, when measured in the following method. It turns to an anisotropic molten state above the flow temperature.

Flow temperature is the temperature at which the melt viscosity of a resin is 48000 poise when the resin is melted by heating it at a rate of 4° C./min. and extruded through a nozzle of 1 mm in inner diameter and 10 mm in length.

The above-described liquid crystal polyester is synthesized from different kinds of aromatic hydroxycarboxylic acids or their ester-forming derivatives or from an aromatic hydroxycarboxylic acid, aromatic dicarboxylic acid, aromatic diol or their ester-forming derivatives. It has for example the following repeating structural units.

Repeating structural units derived from aromatic hydroxycarboxylic acid

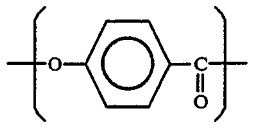

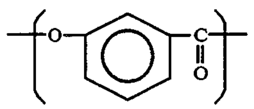

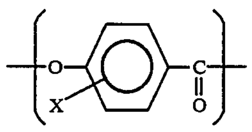

(X represents halogen or alkyl group.)

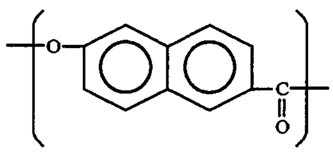

-continued
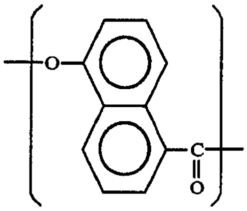
Repeating structural units derived from aromatic dicarboxylic acid
(B1)
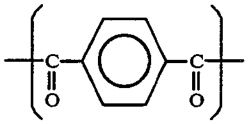
(B2)
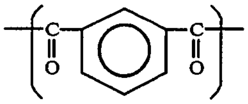
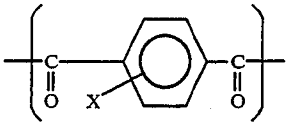
(X represents halogen, alkyl or allyl group.)
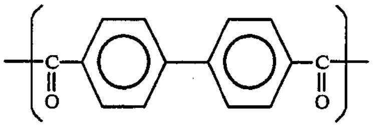
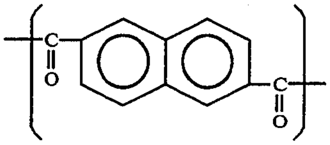
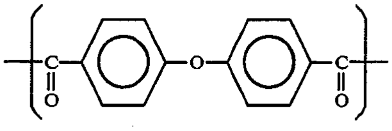
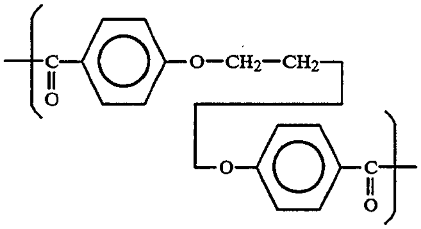
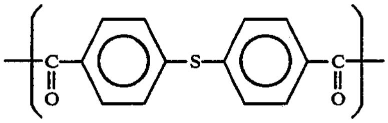
Repeating structural units derived from aromatic diol:
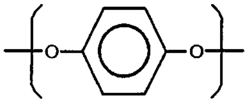
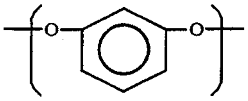
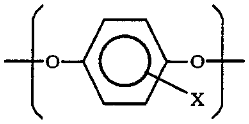
(X represents halogen, alkyl or allyl group.)
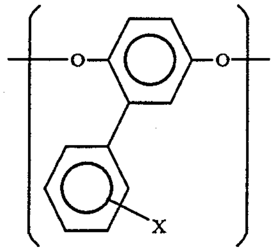
(X represents H, halogen or alkyl group.)
(C1)
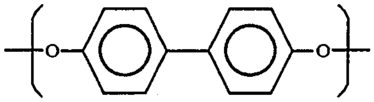
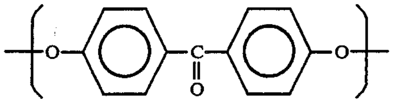
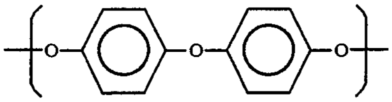
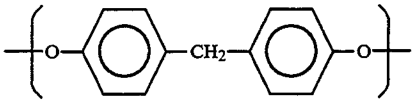
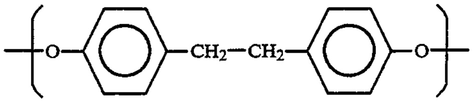
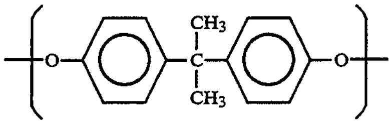
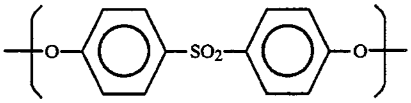

-continued

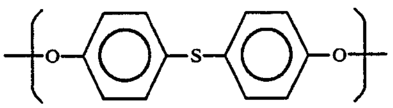

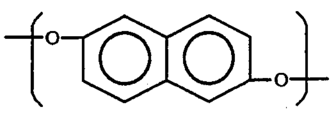

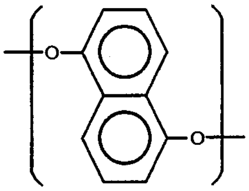

Liquid crystal polyesters having repeating structural units as shown by the following formulas (A), (B) and (C) are especially preferable as materials for stripping fingers in that they have good heat resistance, mechanical properties and moldability in a balanced manner.

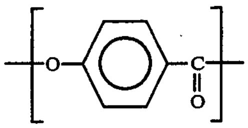

(A)

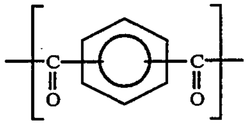

(B)

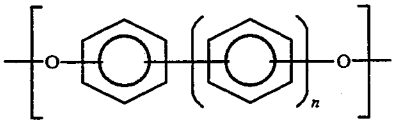

(C)

(In the formulas, n represents 0 or 1, the molar ratio (A):(B) is 1:1 to 10:1. The molar ratio (B):(C) is 9:10 to 10:9. Aromatic substituents in (B) and (C) are arranged in para- or meta-positions relative to one another.)

The aluminum borate whiskers used in this invention are white needle-like crystals expressed by the chemical formula $9Al_2O_3.2B_2O_3$ or $2Al_2O_3.B_2O_3$ and having an average fiber diameter of 0.05–5 microns and an average fiber length of 2–100 microns.

A composition expressed by $9Al_2O_3.2B_2O_3$ has a true specific gravity of 2.93–2.95 and a melting point of 1420°–1460° C. It is prepared by heating at least one of aluminum hydroxydes and aluminum inorganic salts and at least one of boron oxides, oxygen acids and alkali metal salts to 900°–1200° C. in the presence of fusing agents comprising at least one of sulfates, chlorides, carbonates of alkari metal to react and develop them. On the other hand, a composition expressed by $2Al_2O_3.B_2O_3$ has a true specific gravity of 2.92–2.94 and a melting point of 1030°–1070° C. It is prepared by carrying out the reaction at 600°–1000° C. using the same components and the fusing agents as those used for preparing $9Al_2O_3.2B_2O_3$ to react and develop them.

In order to further improve the reinforcing effect of the aluminum borate whiskers, it is effective to improve the wettability and bond strength between the aluminum borate and the liquid polyester as the matrix by treating the surface with a coupling agent. The coupling agent used for this purpose may be a silicon, titanium, aluminum, zirconium, zirco aluminum, chrome, boron, phosphorus or amino acidic agent. The aluminum borate whisker is preferably one expressed by the chemical formula $9Al_2O_3.2B_2O_3$. They are commercially available e.g. under the name of Alborex G by Shikoku Chemicals, which has an average fiber diameter of 0.5–1 micron and an average fiber length of 10–30 microns.

Aluminum borate whiskers should be added to the liquid crystal polyester in the ratio of 5–50%, preferably 10–40% by weight with respect to the total amount of the liquid crystal polyester and the aluminum borate whiskers.

Graphite, which can improve the thermal conductivity and thus the non-stick property with respect to toner, may be added to the liquid crystal polyester composition in the ratio of 5–30 percent by weight. If less than 5%, the graphite could not improve non-stick property. If more than 30%, it will have a bad influence on the melt moldability.

In addition to aluminum borate whiskers and the graphite, one or more heat-resistant fibers which can withstand the molding temperature for liquid crystal polyester (normally 300°–400° C.) may be added in such an amount that will not impair the object of this invention. Heat-resistant fibers include glass fiber, carbon fiber, graphite fiber, ceramic fiber, rock wool, slag wool, potassium titanate whiskers, silicon carbide whiskers, sapphire whiskers, wollastonite, steel wires, copper wires, stainless steel wires, silicon carbide fiber and aromatic polyamide fiber.

One or more of the following substances may be added together with the abovesaid heat-resistant fibers: additives such as antioxidants, heat stabilizers, ultraviolet absorbers, lubricants, release agents, coloring agents, flame-retardants, flame-retardant assistants, antistatic agents and crystallization promotors which are added in ordinary resin compositions, wear resistance improvers (such as carborundum, quartzite powder, molybdenum disulfide and fluororesin), tracking resistance improvers (such as silica), and other fillers (substances which are stable at 300° C. or over such as glass beads, glass balloons, calcium carbonate, alumina, talc, diatom earth, clay, kaolin, gypsum, calcium sulfite, mica, metallic oxides, inorganic pigments), agents for imparting thixotropic properties such as fine silica powder, fine talc and diatom earth, and polyether oil and organopolysiloxane for improving the orientation peculiar to the liquid crystal polyester to increase and stabilize its self-reinforcing properties, and heat resistant amorphous polyether resins.

Before using the stripping fingers, they are preferably subjected to annealing for 15 hours at 150°–340° C. in order to eliminate strains during molding and to improve its dimensional stability while used at high temperatures. Also, as will be described hereinafter, the annealing may be carried out during baking after applying PFA resin to the stripping fingers.

In order to impart good non-stick properties to the edges or entire surfaces of the stripping fingers, a PFA coating is provided. When baking, the coating is melted to form a continuous PFA coating layer at least on the surfaces. Commercially available PFA resins include PFA-X500CL made by Du Font-MITSUI FLUOROCHEMICALS. Such a coating material may be applied to the molded article by spray coating, dip coating, electrostatic coating or powder coating. The temperature at which the PFA coating is baked to the stripping fingers should be higher than the melting point of the PFA resin, preferably 330°-400° C. By conducting the heat-melt treatment at a temperature of 330° C. or higher, PFA will melt sufficiently at its superficial layer so as to turn into a filmy state. Thus, the coating exhibits excellent non-stick property and adheres strongly to the stripping fingers. If higher than 400° C., the stripping fingers might be deflected markedly. The thickness of the PFA film is preferably 5-40 microns. If thinner than 5 microns, the wear resistance is insufficient. A film thickness of 40 microns or larger might have a bad influence on the dimensions of the edge tips of the stripping fingers. It is also desirable to add reinforcing materials, lubricants, etc. to a fusing type PFA resin coating material so as to increase its wear resistance. Further, in order to prevent static electrification, antistatic agents such as carbon black may be added. Also, in order to increase the bond strength between the stripping fingers and the PFA resin, the surfaces of the stripping fingers may be subjected beforehand to tumbling (barrel tumbling) or shot blasting.

The stripping fingers molded of a liquid crystal polyester resin composition comprising a liquid crystal polyester having a flow temperature of 340° C. or higher and aluminum borate whiskers exhibit an increased rigidity and mechanical strength at high temperatures. The fingers thus made can keep the radius of curvature of their edges at a desired level for a prolonged period of time without impairing the excellent thermal shock resistance and moldability peculiar to liquid crystal polyesters. Thus, their heat load resistance and heat fatigue resistance at high temperatures improve greatly (especially at a temperature of 200° C. or higher).

Further by forming the perfectly continuous PFA resin coating on the edge or entire surface of each stripping finger by baking at 330° C. or higher, the amount of toner adhering to the stripping fingers can be reduced because of its non-stick property. This prevents paper surfaces from being soiled with toner.

As described above, the stripping fingers according to the present invention has excellent self-reinforcing properties, heat aging resistance and thermal shock resistance which are inherent to liquid crystal polyester, as well as excellent heat fatigue resistance and heat load resistance. Further, attack on the counter roller can be reduced to a minimum and the shape retainability at the tips is high. Thus, reliability is high especially in continuous use at high temperatures. The stripping finger is useful in applications where long life is expected. Further, a perfectly continuous PFA resin coating is formed at least on the edge surface by melting the resin at 330° C. or higher. Due to high non-stick property of PFA, the amount of toner that sticks to the stripping fingers can be reduced. Thus paper surfaces are less likely to be soiled with toner. Such stripping fingers can be used not only for a device having only a copying function but for what is called an intelligent copier having high-resolution image processing, editing and facsimile functions and equipped with input and output devices for connection with other office automation machines.

Other features and objects of the present invention will become apparent from the following description taken with reference to the accompanying drawings, in which.

Figure 1:
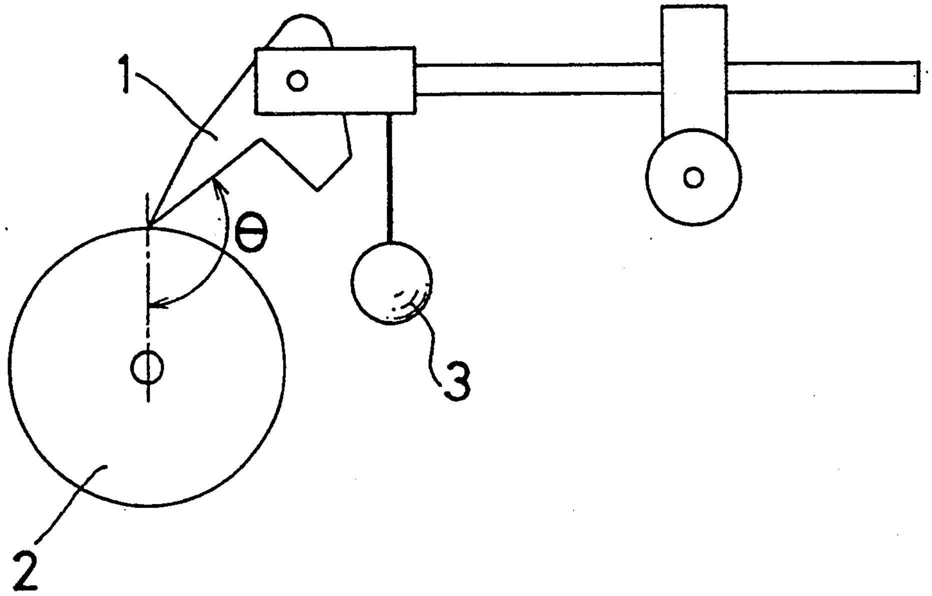
FIG. 1 is a schematic side view of a heat deflection tester.

The materials used in the examples and the comparative examples are shown below, in which (A), ($B_1$), ($B_2$) and ($C_1$) represent the repeating units of the above-described liquid crystal polyesters.

(1) liquid crystal polyesters liquid crystal polyester e,crc/1/ : contents ratio (molar %) $A:B_1:C_1=50:25:25$, flow temperature as measured with the above-mentioned Koka type flow tester (SHIMADZU): 375° C. Liquid crystallization starting temperature: 385° C.

liquid crystal polyester ②: contents ratio (molar %) $A:B_1:B_2:C_1=50:20:5:25$, flow temperature: 352° C. Liquid crystallization starting temperature: 364° C.

liquid crystal polyester e,crc/3/ : contents ratio (molar %) $A:B_1:B_2:C_1=60:15:5:20$, flow temperature: 323° C. Liquid crystallization starting temperature: 340° C.

(2) whiskers aluminum borate whiskers (Shikoku Chemicals: ALBOREX G)

potassium titanate whiskers (Titan Kogyo KK: HT300)

(3) graphite graphite (Nippon Kokuen: ACP)

EXAMPLES 1-4, COMPARATIVE EXAMPLES 1-3

After dryblending the materials in the ratios shown in Table 1, the mixture was supplied into a twin-screw melt extruder (Ikegai Iron Works: PCM-30) and granulated kneading and extruding with a screw revolving speed at 150 rpm. The pellets thus produced were injection molded at an injection pressure of 600 kg/cm$^2$, mold temperature 180° C. to mold test pieces for flexural test and test pieces having the same shape as stripping fingers used in a copier FX-2700 by FUJI XEROX. The cylinder temperatures of the twin-screw melt extruder and the injection molding machine were 380° C. and 390° C., respectively, for the composition containing liquid crystal polyester ① (examples 1-3 and comparative examples 1 and 2), 360° C. and 370° C., respectively, for the composition containing liquid polyester ② (example 4), and 340° C. and 350° C., respectively, for the composition containing liquid polyester e,crc/3/ (comparative example 3). In order to examine the degree of damage to the counter roller, a coating primer liquid (Du Pont-MITSUI FLUOROCHEMICALS: MP-902AL) was applied to these test pieces by spray coating and dried, and a PFA coating liquid (DU Pont-MITSUI FLUOROCHEMICALS: X500CL) was applied thereon by spray coating. The test pieces were then heated for 30 minutes at 340° C. to fuse the coatings.

Their flow temperature, water absorption, flexural strength, flexural modulus, Izod impact strength and heat distortion temperature were measured. The results are shown in Table 2. As for the test pieces in the shape of stripping fingers, the radius of curvature at the edge tips, high-temperature rigidity, heat fatigue resistance and heat load resistance were measured. Also, the external appearance on the surfaces of the stripping fingers were evaluated for the blisters. The results are shown in Table 3. The above measurements and evaluations were made in the following manners.

Measurements of Physical Properties (1) Flow temperature: measured with a Koka type flow tester CFT-500 type capillary rheometer made by Shimadzu. Namely, the resin heated at a rate of 4° C./min. was extruded through a nozzle 1 mm in inner diameter and 10 mm in length under a load of 100 $kg/cm^2$ and the temperature was measured when the melt viscosity reached 48000 poise.

(2) Water absorption: The test pieces for flexural test were dried for 15 hours at 150° C. and then immersed in 23° C. water for 200 hours. The changes in weight after this test were regarded as water absorptions.

(3) Flexural strength, flexural modulus: Test pieces for flexural test (127×12.7×6.4 mm) were prepared and measured under ASTM D-790. Flexural modulus was measured not only at room temperatures but at 250° C.

(4) Izod impact strength: Each of the flexural test pieces was divided in half and measurements were made for these halves under ASTM D-256.

(5) Heat distortion temperature (HDT): Measurements were made for flexural test pieces under ASTM D648.

(6) Liquid crystallization starting temperature: polarization microscope and heated under a crossed nicol at a rate of 10° C. per minute. The temperature was measured when the resin melted and the amount of transmitted light increased. If not melted completely under normal pressure, the measurement was made with the resin under spring pressure.

Evaluation of the Stripping Fingers (1) Radius of curvature at the edge tips

A projector V-16D made by Nicon was used. The values shown are the range between the maximum value and the minimum value when n equals to 100. But the values smaller than 5 microns were all regarded as 1 micron because such small values cannot be measured with high accuracy.

(2) High-temperature rigidity according to the shades of the stripping fingers

Figure 2:
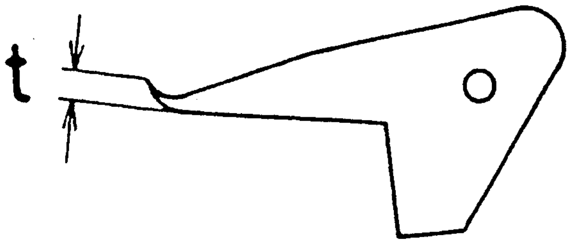
FIG. 2 is a side view showing the amount of deflection at the edge of the stripping finger.

A tester for heat deflection at the edge tips of the stripping fingers (shown schematically in FIG. 1) was used to measure the amounts of deflection t (see FIG. 2) with the contact time set at 1 minute, load (W) on the edge tips of stripping fingers 1 being 20 grf, contact angle (θ) 100 degrees and the surface temperature of roller 2 varied among 210° C., 240° C. and 270° C. (n=10). Then their average was calculated.

(3) Heat fatigue resistance according to the shapes of the stripping fingers

The same tester as used in the high-temperature rigidity test was used to measure the amounts of deflection t (see FIG. 2) with the surface temperature of the roller 2 set at 240° C., load (W) on the edge tips of the stripping fingers 1 at 20 grf, contact angle (θ) of 100 degrees, and contact time varied among one minute, 30 minutes and one hour (n=10). Then their average was calculated.

(4) Heat load resistance according to the shapes of the stripping fingers

The same tester as used in the high-temperature rigidity test was used to measure the amounts of deflection t (see FIG. 2) with the surface temperature of the roller 2 set at 240° C., load (W) oil the edge tips of the stripping fingers 1 varied among 20 grf, 40 grf and 100 grf, with the contact angle (θ) set at 100 degrees and contact time of one minute (n=10). Then their average was calculated.

(5) Evaluation of external appearance of the "blisters" on the surfaces of the stripping fingers The surface conditions of the stripping fingers were evaluated to distinguish those having "blisters" on the surfaces from those having no blisters.

It is apparent from the results on Table 2 that the compositions comprising liquid crystal polyesters ①, ② having flow temperatures of 350° C. or more and aluminum borate whiskers and the compositions comprising the above-mentioned ingredients plus graphite (Examples 1–4) showed a high flexural strength, flexural modulus (250° C.), Izod impact strength and HDT. On the other hand, the composition consisting only of liquid crystal polyester ① (Comparative Examle 1) showed a high Izod impact strength and HDT due to its high orientation but the surface condition was not good and the flexural modulus of elasticity deteriorated sharply at 250° C. The composition comprising liquid polyester ① and potassium titanate whiskers (Comparative Example 2) partially gelatinized during molding and blisters formed on the surface when the molding finished. Further the Izod impact strength was rather low. The composition comprising liquid crystal polyester ③ whose flow temperature is lower than 340° C. and aluminum borate whiskers (Comparative Example 3) showed a sharp deterioration in flexural modulus at 250° C. HDT was 300° C. or lower.

As will be apparent from the results (measured values) shown in Table 3, in Examples 1–4, the radius of curvature of the edge of the stripping fingers was accurate and they showed excellent high-temperature rigidity, heat fatigue resistance and heat load resistance. Comparative Examples 1 and 3 were not satisfactory in terms of the accuracy of the radius of curvature of the edge of the stripping fingers, high-temperature rigidity, heat fatigue resistance and heat load resistance. They were useless as stripping fingers because their tips deflected easily under short-term low load at high temperature. In Comparative Example 2, the surface condition was not good and blisters developed on the surfaces of the stripping fingers. The accuracy of the radius of curvature at the edges of the stripping fingers was too low to be used as stripping fingers.

TABLE 1

| | | Example | | | | Comparative Example | | |
|---|---|---|---|---|---|---|---|---|
| Material | Number | 1 | 2 | 3 | 4 | 1 | 2 | 3 |
| Liquid crystal polyester ① | | 70 | 70 | 60 | — | 100 | 70 | — |
| Liquid crystal polyester ② | | — | — | — | 70 | — | — | — |
| Liquid crystal polyester ③ | | — | — | — | — | — | — | 70 |
| Aluminum borate whiskers | | 30 | 20 | 30 | 30 | — | — | 30 |
| Potassium titanate whiskers | | — | — | — | — | — | 30 | — |
| Graphite | | — | 10 | 10 | — | — | — | — |

TABLE 2

| | | Example | | | | Comparative Example | | |
|---|---|---|---|---|---|---|---|---|
| Material | Number | 1 | 2 | 3 | 4 | 1 | 2 | 3 |
| Water absorption rate (%) | | <0.02 | <0.02 | <0.02 | <0.02 | <0.02 | <0.02 | <0.02 |

TABLE 2-continued

| Material Number | Example 1 | Example 2 | Example 3 | Example 4 | Comparative Example 1 | Comparative Example 2 | Comparative Example 3 |
|---|---|---|---|---|---|---|---|
| Flexural strength (kgf/cm$^2$) | 1950 | 1760 | 1450 | 1930 | 1360 | 1120 | 1920 |
| Flexural modulus (kgf/cm$^2$) | | | | | | | |
| Room temp. | 225000 | 191000 | 196000 | 211000 | 150000 | 157000 | 197000 |
| 250° C. | 86000 | 73000 | 75000 | 70000 | 52000 | 60000 | 55000 |
| Izot impact strength (kgf cm/cm) | 55 | 40 | 25 | 62 | 63 | 11 | 67 |
| Heat distortion temperature[HDT] (°C.) | 351 | 346 | 342 | 318 | 355 | 349 | 278 |

TABLE 3

| Evaluation item Number | Example 1 | Example 2 | Example 3 | Example 4 | Comparative Example 1 | Comparative Example 2 | Comparative Example 3 |
|---|---|---|---|---|---|---|---|
| Radius of curvature at edge tips (μm) | 10~30 | 10~30 | 15~30 | 10~35 | 1~40 | 5~30 | 5~30 |
| High temp. rigidity (μm) | | | | | | | |
| 210° C. | 13 | 15 | 12 | 14 | 25 | 16 | 27 |
| 240° C. | 16 | 23 | 16 | 21 | 40 | 25 | 32 |
| 270° C. | 21 | 25 | 18 | 24 | 50 | 27 | 40 |
| Heat fatigue resistance (μm) | | | | | | | |
| 1 min. | 14 | 16 | 12 | 17 | 45 | 19 | 39 |
| 30 min. | 22 | 30 | 19 | 30 | 75 | 33 | 51 |
| 1 hr. | 24 | 30 | 20 | 34 | 90 | 38 | 55 |
| Heat load resistance (μm) | | | | | | | |
| 20 grf | 16 | 23 | 16 | 21 | 40 | 25 | 32 |
| 40 grf | 24 | 27 | 22 | 26 | 62 | 29 | 48 |
| 100 grf | 38 | 42 | 31 | 40 | 105 | 44 | 85 |
| Blister on the surface of stripping fingers | NO | NO | NO | NO | NO | YES | NO |

What is claimed is:

1. Stripping fingers molded of a liquid crystal polyester resin composition comprising a liquid crystal polyester having the repeating structural units expressed by the following formulas (A), (B) and (C):

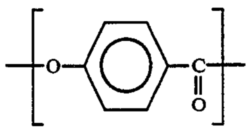
(A)

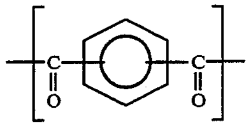
(B)

-continued

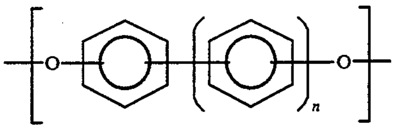
(C)

wherein n is 0 or 1 and having a flow temperature of 340° C. or higher, and about 5 to 50% of aluminum borate whiskers, said flow temperature being the temperature at which the melt viscosity of a resin is 48000 poise when the resin is melted by heating it at a rate of 4° C./min. and extruded through a nozzle of 1 mm in inner diameter and 10 mm in length under a load of 100 kgf/cm$^2$.

2. Stripping fingers as claimed in claim 1 wherein said repeating structural units, the molar ratio (A):(B) is 1 to 10:1, the molar ratio (B):(C) is 9:10:9, and the aromatic substituent groups in (B) and (C) are located in para- or meta-positions with respect to each other.

3. Stripping fingers as claimed in claim 1 or 2, wherein the edges or entire surfaces of said stripping fingers are coated with tetrafluoroethylene-perfluoroalkylvinylether copolymer.

* * * * *